United States Patent [19]

Zumbusch et al.

[11] Patent Number: 5,145,329
[45] Date of Patent: Sep. 8, 1992

[54] HOMOPLANAR BRUSHLESS ELECTRIC GEROTOR

[75] Inventors: Steven J. Zumbusch, Eden Prairie, Minn.; Walter K. O'Neil, Birmingham, Mich.

[73] Assignee: Eaton Corporation, Cleveland, Ohio

[21] Appl. No.: 546,625

[22] Filed: Jun. 29, 1990

[51] Int. Cl.$^5$ .................................. F04B 17/00
[52] U.S. Cl. ............................ 417/356; 418/171
[58] Field of Search ............ 417/352, 353, 354, 355, 417/356, 423.7; 418/171

[56] References Cited

U.S. PATENT DOCUMENTS

| | | | |
|---|---|---|---|
| 2,386,896 | 10/1945 | Hill et al. | |
| 2,760,348 | 8/1956 | McAdam | 417/356 X |
| 3,915,603 | 10/1975 | Swedberg | 418/61 |
| 3,995,978 | 12/1976 | Kahn et al. | 418/171 |
| 4,082,480 | 4/1978 | McDermott | 417/283 |
| 4,207,033 | 6/1980 | Drutchas et al. | 417/251 |
| 4,361,419 | 11/1982 | Vohringer | 418/171 X |
| 4,459,087 | 7/1984 | Barge | 417/356 |
| 4,526,518 | 7/1985 | Wiernicki | 417/420 |
| 4,580,951 | 4/1986 | Carleton et al. | 417/366 |
| 4,619,588 | 10/1986 | Moore, III | 417/366 |
| 4,639,203 | 1/1987 | Zumbusch | 418/61 |
| 4,645,430 | 2/1987 | Carlton | 417/359 |
| 4,662,827 | 5/1987 | Wiernicki | 417/363 |
| 4,758,132 | 7/1988 | Hartwig | 417/353 |
| 4,949,022 | 8/1990 | Lipman | 417/423.7 X |
| 4,953,811 | 9/1990 | Smith | 417/356 X |

FOREIGN PATENT DOCUMENTS 68783  3/1988  Japan .................. 418/171

OTHER PUBLICATIONS

Sourcebook of Electric Circuits, John Markus, Chapter 52 "Motor Control Circuits", pp. 404–412.
Stepping Motors: A guide to modern theory and Practice, P. P. Acarnley, Chapter 2, "Drive Ciruits", pp. 15–25.
Eaton Gerotors Catalog 11-883, Aug. 1985.

Primary Examiner—Leonard E. Smith
Attorney, Agent, or Firm—L. J. Kasper

[57] ABSTRACT

A homoplanar brushless electric gerotor (10) includes a housing assembly (32) defining a substantially closed cavity (52), a fluid inlet port (88). Inner and outer gerotor pump gears (72,74), are eccentrically disposed for relative rotation within the cavity whereupon a working fluid received at the inlet port at a low pressure is discharged from the outlet port at a high pressure. A plurality of alternatingly radially polarized circumferentially aligned permanent magnets (76) are carried by one of the pump gears for rotation therewith. A stator including windings (44) circumferentially distributed and axially spaced from the permanent magnets (76) electromagnetically interact therewith to effect their rotation upon the electrical energization of the windings (44) by a drive circuit (26).

16 Claims, 2 Drawing Sheets

HOMOPLANAR BRUSHLESS ELECTRIC GEROTOR

TECHNICAL FIELD

The present invention relates to electrically driven gear pumps and, more particularly, to gerotor gear sets driven by a brushless electrical motor to regulate the flow of fuel to an internal combustion engine.

BACKGROUND OF THE INVENTION

Gerotor gear sets have been in commercial use for many years as hydraulic fluid pressure devices such as motors and pumps in which an inner rotor is eccentrically disposed within an outer rotor, each orbiting or rotating about its respective center or axis of rotation, with the interengagement of the teeth of the rotors defining expanding and contracting volume chambers. Motors of this type have been commercially successful, partially because the gerotor gear set is uniquely suited to provide a well-regulated output in a device which is both compact and relatively inexpensive.

Recently, gerotor pumps have been coupled with electric motors in fuel delivery systems for internal combustion engines. Such systems follow the precedent established in most gerotor applications in which one of the gears are directly mechanically driven. In typical prior art fuel pumps, a gerotor set is disposed in-line with the armature of a conventional brush-type fixed speed d.c. motor which mechanically drives the inner or star gear of the gerotor set to effect pumping action. Such configurations, although representing a distinct advantage over more conventional fuel pump designs, are typically large and difficult to package, particularly when integrated within an over-the-road vehicle. In addition to having a relatively high part count with attendant cost and multiple possible failure modes, the use of a brush-type motor can pose an explosion hazard from arcing inherent therein in the presence of a volatile fuel vapors.

The brush arcing problem has been somewhat mitigated in certain so-called wet motor gerotor fuel pump arrangements in which fuel passing through the pump also travels serially through passageways within the motor for purposes of cooling and flushing debris therefrom. This arrangement represents an improvement inasmuch as the cooling effect of the fuel flow permits a down sizing of the motor and enhanced compactness of the overall assembly. However, wet motor gerotor fuel pumps still suffer from a number of the infirmities of prior art devices described herein above.

Additional shortcomings of typical prior art pumps reside in their lack of speed control, and lack of reversibility. Finally, due to their mechanical complexity, they are particularly difficult to package in submersed applications.

It will become apparent from the subsequent description that the invention is equally adapted for use in any gear set comprising an internally-toothed member and an externally-toothed member disposed eccentrically within the internally-toothed member, in which at least one of the toothed members rotate about a fixed axis. However, the present invention is especially advantageous when applied to gerotor sets in which both of the toothed members rotate about offset fixed axes. It is also contemplated that the present invention could be employed with a Geroler TM gear set or similar arrangements wherein the axis of the externally-toothed member is not fixed, but rather orbits about the axis of the internally-toothed member. Furthermore, although described for use as a fuel pump, it should be apparent that the present invention could be easily adapted to any number of configurations and applications.

BRIEF DESCRIPTION OF THE INVENTION

The present invention provides a new and improved pump which overcomes many of the above-described shortcomings of typical prior art approaches. Such a pump, for example, may be employed to deliver fuel to the internal combustion engine of a motor vehicle from a position submerged within the vehicle's fuel tank.

A gerotor pump constructed in accordance with the present invention comprises a housing which defines a substantially closed cavity, a fluid inlet port and a fluid outlet port. Inner and outer gerotor pump gears are eccentrically disposed for relative rotation within the housing cavity whereupon a working fluid received at the inlet port at a relatively low pressure is discharged from the outlet port at an elevated pressure. A plurality of circumferentially aligned permanent magnets are carried by one of the pump gears for rotation therewith. Finally, stator windings are circumferentially distributed and axially radially spaced from the permanent magnets for electromagnetic interaction therewith to impose a rotary torque and thereby affect the gear rotation upon the electrical energization of the windings. This arrangement has the advantage of providing a compact, inexpensive homoplanar motorized gear pump which is particularly well suited for diverse submerged applications in which pump discharge can be selectively controlled.

According to another aspect of the invention, the inner and outer pump gears are constructed of nonferrous material such as powdered metal (pm) alloys or high performance plastics for reduced weight, cost and and improved responsiveness. In this arrangement, a separate ferrous metal band or member is carried by the magnet bearing gear to serve as flux path back iron.

Various other features and advantages of this invention will become apparent upon reading the following specification, which, along with the patent drawings, describes and discloses a preferred illustrative embodiment and an alternative embodiment of the invention in detail.

The detailed description of the specific embodiments makes reference to the accompanying drawings.

DETAILED DESCRIPTION OF THE PREFERRED AND ALTERNATIVE EMBODIMENTS OF THE INVENTION

Figure 1:
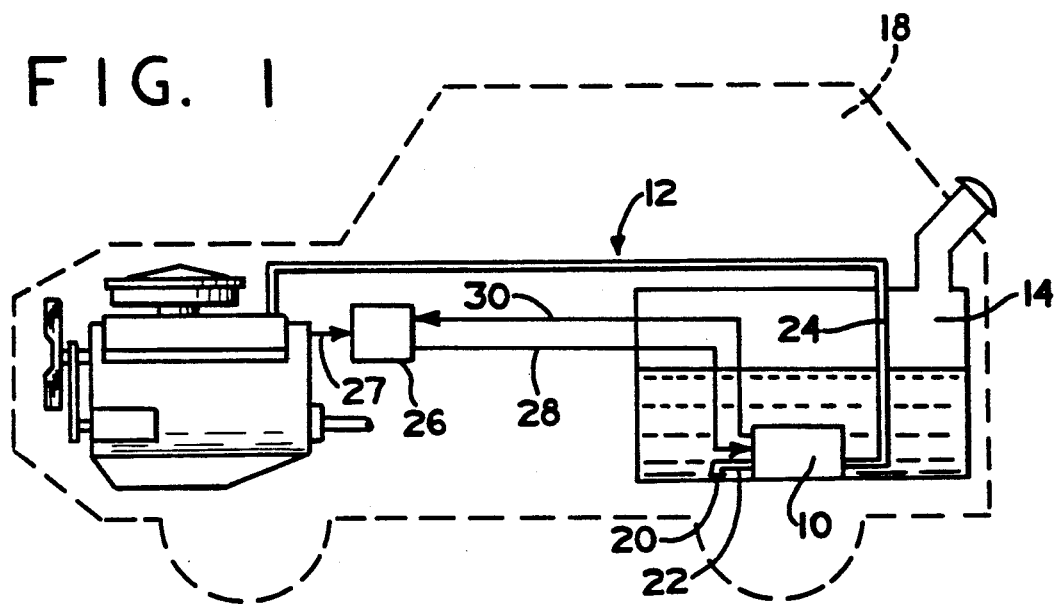
FIG. 1, is a phantom view of an over-the-road vehicle employing the preferred embodiment of the present invention in a fuel delivery system.

Referring to FIG. 1, the preferred embodiment of a homoplanar brushless electric gerotor 10 is illustrated in one of its varied intended applications such as within a fuel delivery system, indicated generally at 12, interconnecting a fuel tank 14 and internal combustion engine 16 of an over-the-road vehicle 18. In its illustrated application, gerotor pump 10 is employed as a fuel pump and will be described herein below in that context, it being understood that such description is by way of example only.

Within the context of the invention described and claimed herein, "homoplanar" refers to the positional interrelationship between a gerotor gear set and a rotating electrical machine which magnetically induces rotation of the gears to effect pumping action via intermeshing of the gear lobes. Specifically, the stator of the electrical machine is distributed about the gerotor gear set upon a plane normal to the gerotor gear axes of rotation/orbit generally bisecting the gear set. The rotor of the electrical machine is joined with one of the gears whereby the electrical excitation of field coils will establish radially oriented magnetic fields imparting rotational forces upon the gear.

Gerotor pump 10 is rigidly mounted to the bottom of fuel tank 14 and draws liquid fuel therefrom into the opening 20 of an inlet conduit 22 connected to gerotor pump 10. An outlet conduit 24 interconnects gerotor pump 10 and the carburetor/fuel injection system (not illustrated) of engine 16. A recirculation fuel line to avoid vapor lock in the engine compartment is not shown but could be incorporated. An electrical drive circuit 26 receives engine, vehicle and operator logic inputs via conductor(s) 27 and electrically energizes gerotor pump 10 in response thereto via conductors 28. A second set of conductors 30 interconnect gerotor pump 10 and drive circuit 26 to provide ring gear position feedback information to drive circuit 26, as will be described in detail herein below. Thus, when electrically energized by drive circuit 26, gerotor pump 10 will tend to draw liquid fuel from tank 14 through inlet conduit 22 at a relatively low pressure and subsequently discharge that fuel to engine 16 through outlet conduit 24 at an elevated pressure. It is contemplated that gerotor pump 10 could be the sole source of fuel pressurization for system 12 or, alternatively, could be employed in conjunction with a conventional engine mounted mechanical fuel pump (not illustrated). Unlike conventional gerotor pumps which are driven mechanically at fixed speed or at engine speed, gerotor pump 10 is driven at an adjustable speed (flow rate) and, if required, is reversible. It can be controlled in response to a given pressure demand or limit if desired. Also, the number of rotations, and thus volume packets of fuel delivered, can be individually counted or metered. It is particularly well suited for use as a transfer pump in conjunction with a separate primary pump, particularly when pressures are low.

Figure 3:
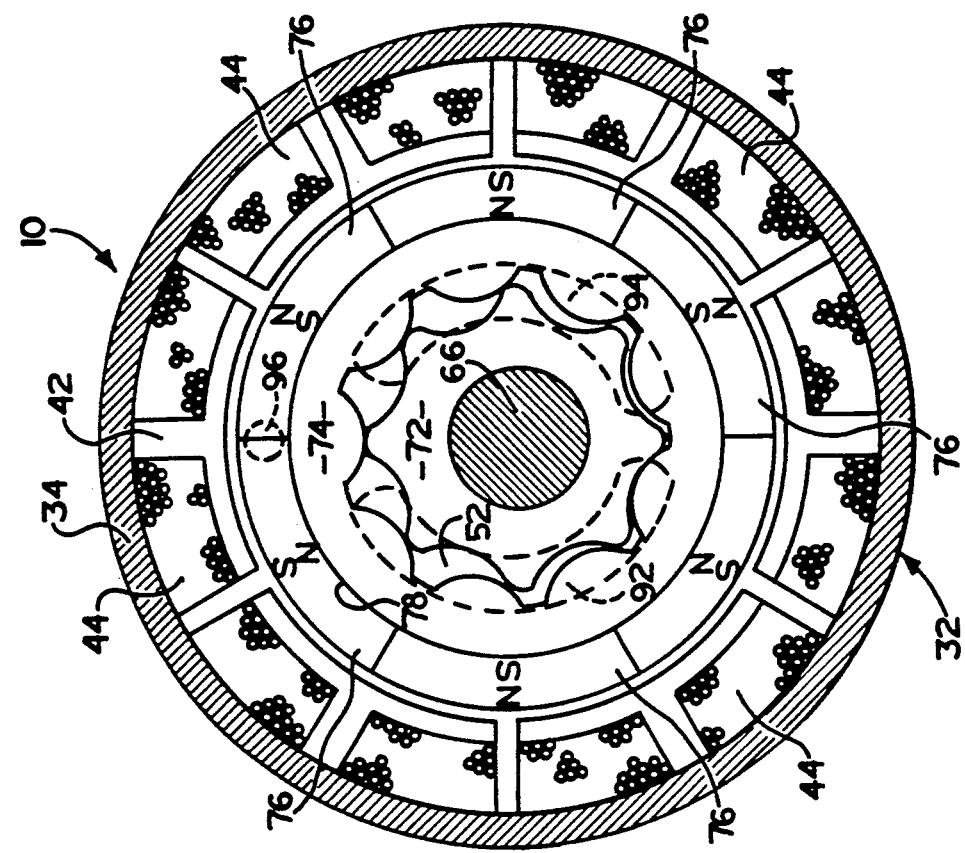
FIG. 3, is a cross-sectional view of the gerotor pump taken on lines 3—3 of FIG. 2.
Figure 2:
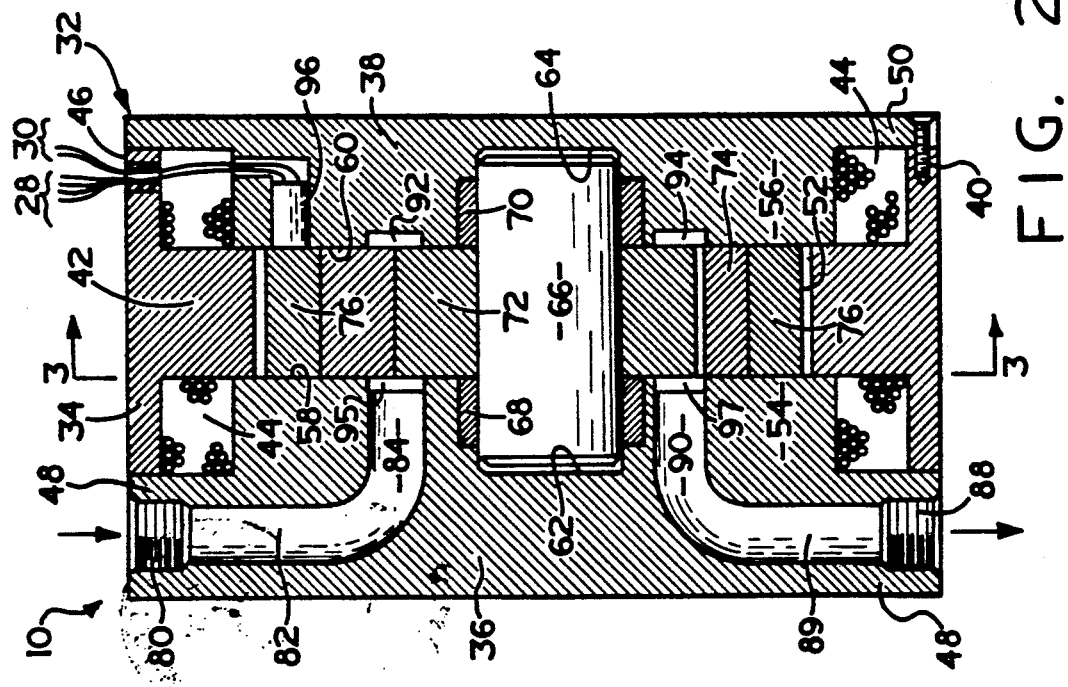
FIG. 2, is a cross-sectional view of the preferred gerotor pump of FIG. 1 on a greatly expanded scale.

Referring to FIGS. 2 and 3, the internal details of a preferred gerotor pump 10 are illustrated in detail. The preferred embodiment of gerotor pump 10 includes a housing assembly or means 32 comprising a cylindrical wall member 34 and opposed circular end cover members 36,38 held in assembly by bolts 40 or other suitable fastener means. Six circumferentially spaced salient pole pieces 42 extend radially inwardly from wall member 34. Pole pieces 42 are either integrally formed with wall member 34 or fabricated separately and affixed thereto such as by welding. Wall member 34 and pole pieces 42 are formed of steel or other suitable ferrous material. End cover members 36,38 are formed of aluminum, plastic or other suitable nonferrous material. Pole pieces 42 are circumferentially spaced to establish large flux gaps therebetween and enable the formation of salient pole windings or coils 44 about each pole piece 42 in a two-phase bifilar winding configuration as is well known in the art. Individual coils 44 are interconnected by leads (not shown) and terminate in conductors 28 which are routed radially externally of gerotor pump 10 through a grommet 46 in wall member 34.

End cover member 36,38 include flange portions 48,50, respectively, mating with wall member 34 to define a generally cylindrical closed cavity 52 within housing assembly 32. End members 36,38 also have complementary centered areas of increased thickness 54,56, respectively, defining opposed parallel wall surfaces 58,60, respectively. The transition portion of end members 36,38 between flange portions 48,50 and areas of increased thickness 55,56, cooperate with wall member 34 and pole pieces 42 to retain windings 44 in their illustrated positions.

Opposed inwardly opening stepped blind bores 62,64 are formed in thickened areas 54,56, respectively, which receive the ends of a shaft 66 carried by bearings 68,70, respectively ensuring that shaft 66 is axially and radially restrained in its illustrated position but free to rotate with respect to the remainder of housing assembly 32. A gerotor star grinner gear 72 is mounted for rotation on or with shaft 66 within cavity 52 and mates with a gerotor ring or outer gear 74. Six circumferentially arranged radially alternately polarized permanent magnets 76 are carried for rotation upon the outer surface 80 of outer gear 74 and are affixed thereto by welding, bonding, adhesives or other suitable fastener means. The outer radial surfaces of permanent magnets 76 are in close proximity to the innermost surfaces of pole pieces 42 and define a small flux gap therebetween. Inner and outer gears 72,74 are dimensioned to be nestingly received within cavity 52 between surfaces 58,60 of thickened portions 54,56, respectively. Inner gear 72 and shaft 66 are formed of either ferrous or nonferrous material and outer gear 74 is formed of ferrous material. Thus, outer gear 74 is carried by inner gear 72 for relative rotation with respect thereto about parallel offset respective axes. Permanent magnets 76 rotate with outer gear 74 in a nearly constant spaced relationship with pole pieces 42 for magnetic interaction therewith when windings 44 are electrically energized. Clearance between the magnets and the pole pieces (magnetic gap) is much greater than the running clearance of the gerotor gears, even with wear over time of the latter. Such coil energization will impose a rotary torque to magnets 76 and gear 74. Outer gear 74 serves as a pumping element in combination with the inner gear 72 as well as back iron for the magnetic flux established by permanent magnets 76 and windings 44. Thus, outer gear 74 and magnets 76 comprise the rotor portion of the rotating electrical machine feature of gerotor pump 10 and wall member 34, pole pieces 42 and windings 44 comprise the stator.

An inlet port 80 formed in end member 36 provides a path of fluid communication with cavity 52 through a radially inwardly extending passage portion 82 and an axially inwardly extending passage portion 84 opening within cavity 52 at a point of intermeshing between inner and outer gerotor gears 72,74. Likewise, an outlet port 88 is also formed within end member 36 and includes a radially inwardly extending passage portion 88 and an axially inwardly extending passage portion 90 opening within cavity 52 at a point of intermeshing between gerotor gear 72,74 circumferentially opposed from passage portion 84 of inlet port 80. Crescent shaped shadow pockets 92,94 are formed in wall surface 60 of cover member 38 opposite the points of entry of axial passage portions 84,90 within cavity 52. Passage portions 84,90 also open into similarly crescent shaped openings 95,97 in surface 58 at their respective points of entry into cavity 52. When mated with the fuel delivery system 12 illustrated in FIG. 1, inlet port 80 would be suitably interconnected with inlet conduit 22 and outlet port 88 likewise interconnected with outlet conduit 24. A magnet ring position sensor 96 is disposed within a cavity 98 formed in thickened portion 56 of end member 38 which opens into cavity 52 at a radial position corresponding to that of permanent magnets 76. Sensor 96 is positioned essentially flush with surface 60 to be in close rotational proximity with the ring of permanent magnets 76 and is operative to detect the transition therebetween, when the radial polarization sense reverses between adjacent magnets 76 and output a signal on conductor 30 through grommet 46. Alternatively, any number of commercially available sensors could be employed. Furthermore, a detectable target or flag could be carried by the rotor assembly.

The operation of gerotor gear sets as pumps, as well as the porting and shadow pocket arrangements and gear lobe configurations are well known in the art and will not be elaborated upon here for the sake of brevity. A recent catalog of representative commercial products of the assignee of this application is incorporated herein by reference as representative of relevant existing gerotor related technology. Thus, upon rotation of outer gear 74 induced by magnetic interaction between permanent magnets 76, windings 44 and associated magnetic structure, the characteristic intermeshing of gears 72,74 will tend to draw low pressure fluid in through port 80, pressurize it within the trapped volumes between gears 72,74 and discharge the pressurized fluid at port 88. The volume of fluid thus pumped will vary as a function of rotational speed of outer gear 74 which is determined by the level of energization and characteristic frequency of voltage potential impressed upon conductors 28.

Figure 4:
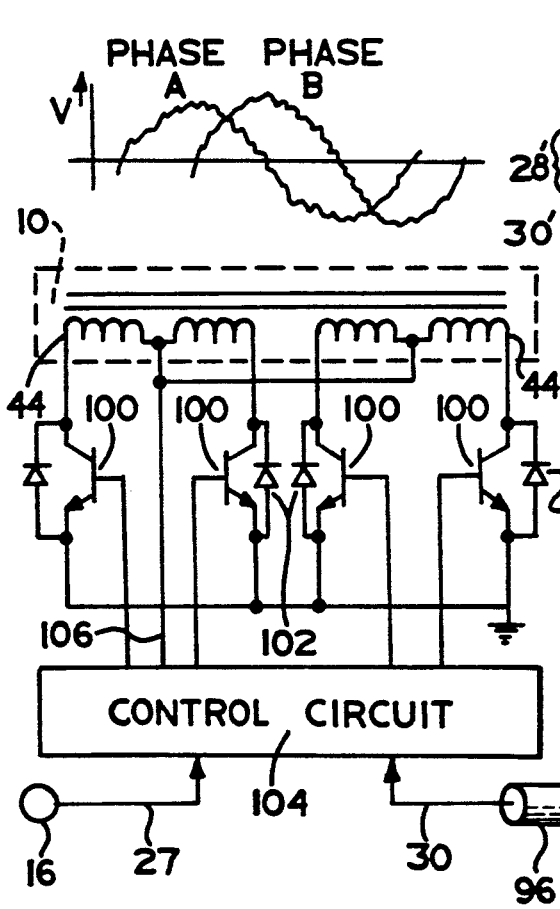
FIG. 4, is a schematic representation of an electrical control system employed in conjunction with the gerotor pump of FIG. 1.

Referring to FIG. 4, drive circuit 26 is shown in schematic/block diagram form as an example of only one of many suitable drive circuits that may be employed with the present invention. In the preferred embodiment of the invention, windings 44 are arranged in a two-phase bifilar configuration. Such windings are generally known in the prior art as represented by chapter two entitled "Drive Circuits Extracted from Stepping Motors: A Guide To Modern Theory and Practice" by P. P. Acarnley, second edition, IEE Control Engineering Series 19, pages 15-25 which is incorporated herein by reference.

Coils 44 of the motor portion of gerotor pump 10 (illustrated in FIG. 4 in its magnetic equivalence) are electrically connected to the collectors of power switching transistors 100 and the cathodes of flyback diodes 102. The anodes of diodes of 102 and the emitters of transistors 100 are commonly connected to ground. The bases of transistors 100 are individually interconnected to a control circuit 104 which also serves as a d.c. power source to windings 44 via a conductor 106. As described hereinabove, control circuit 104 receives position feedback information from gerotor pump 10 via sensor 96 on line 30 as well as speed/flow demand control signals from engine 16 or other suitable transducers on board vehicle 18 on line 27. The operation of drive circuits of the type illustrated in FIG. 4 are well known in the art. Chapter 52 entitled "Motor Control Circuits", pages 404-412 excerpted from the source book of Electronic Circuits by John Markus, McGraw Hill Book Company serves to describe a suitable two-phase induction motor drive circuit in detail. Accordingly, a detailed description will not be included here for the sake of brevity.

Figure 5:
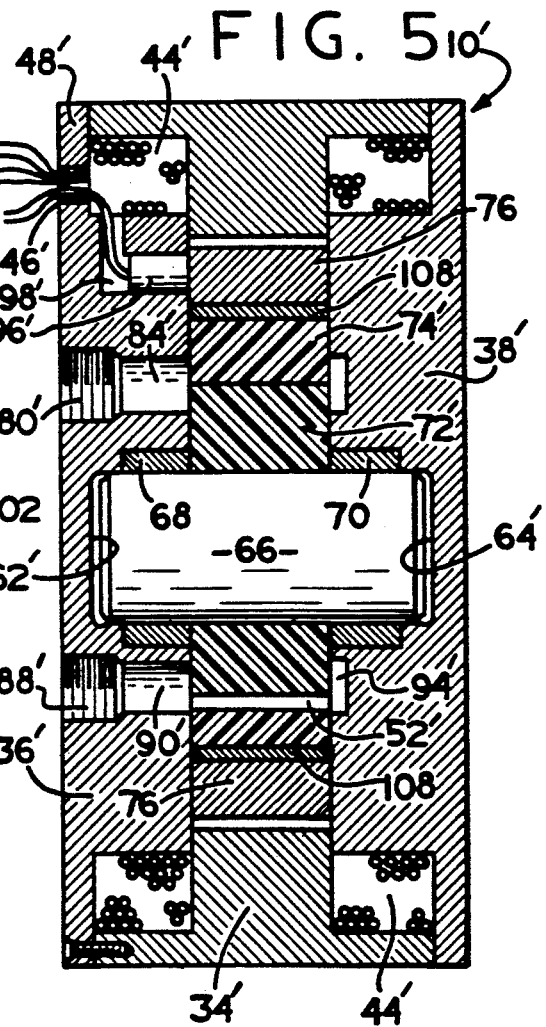
FIG. 5, is a cross-sectional view of an alternative embodiment of the present invention.

Referring to FIG. 5, an alternative embodiment of a gerotor pump 10' is illustrated. For purposes of the following description, comparison and contrast with the preferred embodiment described with respect to FIGS. 2 and 3 can be made as follows. Identical components between the two embodiments bear the same reference numeral. Equivalent or slightly modified components bear the same number but with a prime (') designation.

The alternative embodiment illustrated in FIG. 5, is virtually identical to the preferred embodiment in all material respects except as denoted below. End member 36' is re-configured to provide axial orientation of inlet and outlet ports 80',88', respectively, communicating with cavity 52' through axially directed passage portions 84',90', respectively. Conductors 28',30' are routed axially leftwardly through a grommet 46' in the flange 48' of end member 36'.

Both inner and outer gerotor gears 72',74', respectively, are constructed of nonferrous material such as high performance plastic, powdered metal or the like. A band 108 of mild steel or other suitable ferrous material is disposed radially intermediate the outer surface of outer gear 74' and the inner surface of the ring of magnets 76 to provide flux path back iron.

The embodiment of FIG. 5 provides flexibility in packaging gerotor pump 10 in applications where only axial access is available.

In the embodiment of the invention shown in FIG. 5, bifilar windings 44' are arranged in a distributed embodiment. The windings are supplied with adjustable frequency current waves such as illustrated in FIG. 4. Position sensor 96' provides a signal to controller 104 which is processed to synchronize the current waves with the magnets at all times to provide optimized torque per unit current ratio. The speed of the rotor and thus the fuel flow is controlled in response to an external input demand electronic signal, the position sensor also serving to close a speed control feedback loop.

It is to be understood that the invention has been described with reference to specific embodiments to provide the features and advantages previously described and that such embodiments and combinations are susceptible of modification as will be apparent to those skilled in the art. For example, it is conceivable that the lay out could be reversed in which windings 44 and pole pieces 42 are disposed radially inwardly of inner gear 72 and that magnets 76 could be carried by inner gear 72. Furthermore, it is contemplated that, rather than carrying discrete separate magnets 72 on one of the gerotor gears, a portion of a gerotor gear may have its material appropriately magnetized to provide a monolithic structure. Further, it is contemplated that the permanent magnets could be replaced by a salient pole reluctance motor structure. Lastly, the preferred embodiment illustrates an eight lobe inner gear 72 and a nine lobe outer gear 74; the number of lobes in the gerotor set can be varied depending upon the contemplated application. Likewise, the number of pole pieces 42 and magnets 76 can be varied as should be apparent to those of ordinary skill in the art. Accordingly, the foregoing is not to be construed in a limiting sense.

What is claimed is:

1. A gerotor pump comprising:
   a housing defining a substantially closed cavity, a fluid inlet port and a fluid outlet port,
   inner and outer gerotor pump gears eccentrically disposed for relative rotation within said cavity whereupon a working fluid received at said inlet port at low pressure is discharged from said outlet port at a high pressure;
   a plurality of circumferentially aligned permanent magnets carried by said outer gear for rotation therewith;
   stator means including windings circumferentially encompassing and radially spaced from said permanent magnets for electromagnetic interaction therewith to effect said rotation upon the electrical energization of said windings; and,
   drive circuit means operative to electrically energize said windings in response to receiving at least one parametric input signal, said drive circuit means being operative to energize said windings at a variable rate to effect a variable pump flow rate characteristic.

2. The gerotor pump of claim 1, wherein one of said parametric in put signals comprises a gerotor gear position feedback signal.

3. A gerotor pump comprising:
   a housing defining a substantially closed cavity, a fluid inlet port and a fluid outlet port.
   inner and outer gerotor pump gears eccentrically disposed for relative rotation within said cavity whereupon a working fluid received at said inlet port at low pressure is discharged from said outlet port at a high pressure;
   a plurality of circumferentially aligned permanent magnets carried by said outer gear for rotation therewith;
   stator means including windings circumferentially encompassing and radially spaced from said permanent magnets for electromagnetic interaction therewith to effect said rotation upon the electrical energization of said windings; and,
   said inner and outer gerotor gears being formed of non-ferrous material, said outer gerotor gear including a ferrous material band disposed between said outer gear and said permanent magnets.

4. The gerotor pump of claim 3, wherein at least one of said gerotor gears if formed of a nonferrous material.

5. The gerotor pump of claim 3, wherein said outer gerotor gear is formed of ferrous material and said inner gerotor gear is formed of nonferrous material.

6. The gerotor pump of claim 3, wherein said inlet and outlet ports exit said housing generally axially.

7. The gerotor pump of claim 3, wherein said inlet and outlet ports exit said housing generally radially.

8. The gerotor pump of claim 3, wherein said inlet and outlet ports include means for interconnection with inlet and outlet fuel conduits.

9. The gerotor pump of claim 3, further comprising mean operative to hermetically seal said windings from said fuel.

10. The gerotor pump of claim 3, wherein said inner and outer gears rotate about fixed parallel axes.

11. The gerotor pump of claim 3, wherein both said gerotor gears are formed of ferrous materials.

12. The gerotor pump of claim 3, further comprising gerotor gear position sensor means carried by said housing.

13. The gerotor pump of claim 12, wherein said sensor means is disposed in rotational alignment with said permanent magnets to monitor the polar orientation thereof.

14. The gerotor pump of claim 3, further comprising drive circuit means operative to electrically energize said windings in response to receiving at least one parametric input signal.

15. The gerotor pump of claim 14, wherein one of said parametric input signals comprises a gerotor gear position feedback signal.

16. The gerotor pump of claim 14, wherein said drive circuit means is operative to energize said windings at a variable rate to effect a variable pump fuel flow rate characteristic.

* * * * *